Patented May 16, 1944

2,348,705

UNITED STATES PATENT OFFICE 2,348,705

ETHYLENESULPHONYL POLYMER

Van Vernon Alderman, Arden, and William Edward Hanford, Wilmington, Del., assignors to E. I. du Pont de Nemours & Company, Wilmington, Del., a corporation of Delaware No Drawing. Application April 30, 1940, Serial No. 332,609

8 Claims. (Cl. 260—84)

This invention relates to organic compounds, and more particularly, to polymers, including copolymers, of unsaturated organic compounds.

This invention has as an object new polymeric, including copolymeric, products. It has as a further object new compositions of matter containing a plurality of sulphonyl groups as lateral substituents in the polymer chain. Another object is the polymerization of ethylenesulphonyl derivatives. Still another object is the preparation of monomeric esters of ethylenesulphonic acid. Other objects will appear hereinafter.

These objects are accomplished by the following invention wherein ethylenesulphonic acid or an ester or acid halide thereof is polymerized either alone or in admixture with a polymerizable organic compound containing a methylene ($CH_2$) group attached by an ethylenic double bond to a carbon atom, which is in turn attached to at least one negative group.

Esters of ethylenesulphonic acid are prepared by allowing an ethylenesulphonyl halide (preferably the chloride) to react with the appropriate sodium alcoholate in alcohol solution, or the appropriate sodium phenolate, by reacting aqueous alkali with the sulphonyl halide and the appropriate alcohol dissolved in a suitable organic solvent inert to the reactants and products of the reaction, or by reacting the sulphonyl halide with an alcohol in the presence of an acid acceptor such as alkali carbonates or tertiary amines, to accept the hydrogen halide generated.

The polymerization of ethylenesulphonic acid and its derivatives may be carried out under the influence of ultra-violet light or heat and preferably in the presence of peroxide catalysts. The rate of polymerization and the nature of the polymers depends upon the ingredient or ingredients being polymerized and also upon the conditions of polymerization. Generally speaking, the polymerizations proceed most rapidly under the influence of ultra-violet light, while with heat and peroxide catalysts the time necessary for effecting a similar degree of polymerization may be five to ten times as great. Thus polymers of ethylenesulphonic acid and of its esters, and halides, and their copolymers with polymerizable organic compounds containing a methylene ($CH_2$) group attached by an ethylenic double bond to a carbon atom which is in turn attached to at least one negative group are obtained by exposing the monomers or mixtures of the monomers to ultraviolet light at ordinary temperature for extended periods up to several days, or by heating these monomers or mixtures of monomers to 70° C. in the presence of a peroxide catalyst such as benzoyl peroxide or ascaridol.

The more detailed practice of the invention is illustrated by the following examples, wherein parts given are by weight. There are of course many forms of the invention other than these specific embodiments.

EXAMPLE I

*Preparation of ethylenesulphonic acid*

A suspension of 200 parts of 1,2-ethanedisulphonyl chloride in 2000 parts of water is boiled until the acid chloride disappears. The solution is filtered and concentrated. Repeated addition of water and reevaporation finally gives a straw-colored syrup, free of hydrogen chloride, from which residual water is removed under a pressure of 2 mm. Distillation of the residue under a pressure of 1 mm. of mercury gives ethylenesulphonic acid which boils at 125° C. and is a colorless, hygroscopic syrup which reddens on standing; $d_4^{25}$, 1.3921; $n_d^{25}$ 1.4496.

Analysis: Calculated for $C_2H_4SO_3$: Neutralization equivalent, 108; S, 29.63%. Found: Neutralization equivalent 107.7; S, 29.85%.

EXAMPLE II

*Preparation of ethyl ethylenesulphonate*

To a stirred, cooled solution of 81 parts ethylenesulphonyl chloride and 39 parts ethanol in 200 parts ether is added 28 parts sodium hydroxide dissolved in 140 parts of water. After 4 hours the ethereal layer is washed with water, dried over magnesium sulphate, and distilled. There is recovered 15 parts ethylenesulphonyl chloride and 15 parts or a 17% yield of ethyl ethylenesulphonate which boils at 72–76° C. under 5 mm. and at 52° C. under 1 mm.; $d_4^{25}$ 1.1831; $n_d^{25}$ 1.4316.

Analysis: Calculated for $C_4H_8SO_3$: Equivalent weight, 136; S, 23.48%; C, 35.09%; H, 5.96%. Found: Equivalent weight by saponification, 125; S, 22.88%; C, 34.42%; H, 5.66%.

EXAMPLE III

*Preparation of phenyl ethylenesulphonate*

To a solution of 19 parts anhydrous phenol in 10 parts absolute methanol is added 10.8 parts of sodium methylate dissolved in methanol. The methanol is removed by distillation. Dry dioxane is added and this removed at 70° C. under 3 mm. pressure, and the operation is repeated once more. Finally most of the solvent is removed by heating the sodium phenoxide to 70° C. under 3 mm. for 12 hours. To the sodium phenoxide, so obtained, dissolved in 100 parts dry dioxane is added 25 parts ethylenesulphonyl chloride at 10° C. The solution is stirred for 15 hours at ordinary temperature. Upon distillation under 2 mm. pressure there is obtained 3 parts of phenyl ethylenesulphonate boiling at 44–46° C.; $n_d{}^{25}$, 1.4258; $d_4{}^{25}$, 1.1657.

Analysis: Calculated for $C_8H_8O_3S$: Equivalent weight 184. Found: Equivalent weight 189.

Example IV

Preparation of isobutyl ethylenesulphonate

To a suspension of 19.2 parts sodium isobutoxide in 50 parts dry benzene maintained at 10° C. is added rapidly 25 parts ethylenesulphonyl chloride. The mixture is stirred rapidly for 4 hours. The solution is filtered from the suspended solids and subjected to distillation under reduced pressure. There is recovered 8 parts of ethylenesulphonyl chloride which boils at 46–48° C. at 8 mm. and 2 parts of isobutyl ethylenesulphonate which boils at 75–78° C. under 5.5 mm.; $n_d{}^{25}$, 1.4258; $d_4{}^{25}$, 1.1898.

Analysis: Calculated for $C_6H_{12}O_3S$: S, 19.51%. Found: S, 21.32%.

Example V

Polyethylenesulphonic acid

Several weeks' exposure of monomeric ethylenesulphonic acid in a sealed tube to ultra-violet light gives a soft, rubbery, dark-colored, completely water-soluble polymer possessing at least 80% of the acidity calculated for polyethylenesulphonic acid. In the substantial absence of ultra-violet light at ordinary temperatures, no polymerization of ethylenesulphonic acid is observed. Even at 70° C. in the absence of ultra-violet light with or without peroxide catalysts, the polymerization is very slow. By "exposure to ultra-violet light" is meant exposure of the specimen in a "Pyrex" tube to a quartz mercury vapor lamp at a distance of 15 inches.

Example VI

Ethyl polyethylenesulphonate

Two weeks' exposure of monomeric ethyl ethylenesulphonate in a sealed "Pyrex" tube to ultra-violet light gives a soft, rubbery, yellow-colored polymer. Phenyl and isobutyl ethylenesulphonates polymerize more slowly under ultra-violet light.

Ethylenesulphonic acid or ethyl ethylenesulphonate copolymerize with vinyl acetate, methyl methacrylate, methyl-alpha-chloroacrylate in a weight ratio of 1:3 at 70° C. with benzoyl peroxide catalyst, and at room temperature under ultra-violet light (exposure to a Cooper-Hewitt mercury lamp) during 2 to 10 days. In some instances, e. g., the copolymerization of vinyl acetate and ethylenesulphonic acid, the copolymerization is so exothermic as to be accompanied by some decomposition, evidenced by charring. The results of copolymerizations are summarized below.

Example VII

Ethylenesulphonic acid (1 part) and monomeric methyl methacrylate (3 parts) show no signs of polymerization on mixing at 25° C. When the mixture is heated for 24 hours at 70° C. or exposed for 24 hours to the ultra-violet light of the Cooper-Hewitt mercury lamp, a brown translucent copolymer is obtained which is soluble in 0.1 N NaOH, is acid to litmus and has a Mohs' hardness of 2.5.

Example VIII

Ethylenesulphonic acid (1 part) and monomeric methyl α-chloroacrylate (3 parts), when combined in "Pyrex" vessels and heated to 70° C. for 24 hours or exposed to ultra-violet light for 24 hours, copolymerize to give brown, clear, thermoplastic polymers which are soluble in 0.1 N NaOH, are acid to litmus, and are slightly softer than the corresponding methyl α-chloroacrylate controls.

Example IX

An emulsion of 75 parts of chloroprene and 3.75 parts of ethylenesulphonic acid in 164 parts of water is made, using as emulsifying agents 10 parts of a 65% aqueous solution of the sodium salt of the sulphate ester of oleyl acetate and 0.37 part of a sulphonated naphthalene-formaldehyde condensation product. The emulsion is heated for two hours at 40–42° C. It is then stabilized by addition of 1% (based on the weight of polymerizable ingredients) of a mixture comprising 55% of phenyl-beta-naphthylamine and 45% of diphenylamine, and 1% of tetramethylthiuram disulphide. The polymer is coagulated with brine, washed thoroughly with water on a corrugated rubber mill, and dried on a warm, smooth roller mill. During the latter operation, 1% by weight of phenyl-beta-naphthylamine is worked into the polymer. The yield is 65 parts of rubber like product whose sulphur content (1.09%) indicates a composition corresponding to about 3.6% of ethylenesulphonic acid. The vulcanizate of this polymer has excellent tensile strength (3875 lbs. per sq. in. at 465% elongation). Its oil resistance and freeze resistance are fully as good as those of a chloroprene polymerized in the presence of sulphur, and its physical properties are markedly superior to those of chloroprene polymerized in the same manner, but in the absence of ethylenesulphonic acid.

Example X

Ethyl ethylenesulphonate (1 part) and vinyl acetate (3 parts), exposed in a "Pyrex" vessel, to a Cooper-Hewitt mercury lamp 15 inches distant, for 24 hours, copolymerize to a yellow, tough, thermoplastic polymer, of Mohs' hardness of 1.4.

Example XI

Ethyl ethylenesulphonate (1 part) and methyl methacrylate (3 parts) copolymerize at 70° in 200 hours and under ultra-violet light in 24 hours to slightly rubbery, clear polymers of Mohs' hardness of 2.0.

Example XII

Ethyl ethylenesulphonate (1 part) and methyl α-chloroacrylate (3 parts) copolymerize at 70° in 48 hours and under ultra-violet light in 24 hours to tough, clear polymers, of hardness comparable to that of the methyl α-chloroacrylate control (Mohs' hard., 2.5).

The present invention is generic to the preparation of esters of ethylenesulphonic acid and to the esters thus prepared, i. e., to esters wherein the acid hydrogen of ethylenesulphonic acid is replaced by a monovalent organic radical, including the esters with methyl, ethyl, propyl, isopropyl, butyl, amyl, hexyl, decyl, cetyl, stearyl, allyl, benzyl and furfuryl alcohols, phenol, naphthol, cyclohexanol, geraniol, ethylene glycol, glycerol, and ethyl lactate.

The esters can be made by treating the heavy metal salts of ethylenesulphonic acid, for example, the silver salt, with the appropriate alkyl or other aliphatic halide. Ethylenesulphonyl halides such as the chlorides, bromide, or fluoride can also be reacted with sodium alcoholates or phenoxides and with other metal salts, such as the lithium, calcium, or potassium salts in solution or in suspension in any organic liquids inert to the metal alcoholates or phenoxides. Simple esterification by reacting an ethylenesulphonyl halide with an alcohol, with or without solvent or diluent, can also be employed provided an acid acceptor is used to destroy the free hydrogen halide formed during the course of the reaction. Inorganic bases such as the hydroxides of sodium, potassium, barium, calcium, or tertiary amines such as dimethylaniline or pyridine can be employed conveniently as acid acceptors.

The invention is also generic to the polymerization, including copolymerization, of ethylenesulphonic acid, its esters and halides.

The polymerization can be effected in bulk at any temperature below decomposition temperatures using any relatively stable organic peroxide as catalyst, in open or closed containers providing that the open containers do not permit loss of the more volatile compounds or the ingress of moisture, and at subatmospheric, atmospheric, or superatmospheric pressures. The polymerizations and copolymerizations can also be carried out with emulsions of the monomeric materials in appropriate media. The copolymers of this invention are not restricted to any particular range of proportions. Their physical and chemical properties (e. g., toughness, alkali and/or water solubility) depend to a large extent on the proportion of ethylenesulphonic derivatives present in them, and may accordingly vary within a fairly wide range. The ethylenesulphonyl derivatives of the present invention may be copolymerized with polymerizable organic compounds having a methylene ($CH_2$) group attached by an ethylenic double bond to a carbon which is in turn attached to at least one negative group e. g., styrene, vinyl acetate, methyl methacrylate unsymmetrical dichloroethylene, vinyl chloride, vinyl bromide, methyl alpha-chloroacrylate, chloroprene, 1,3-butadiene, methyl vinyl ketone, etc.

The polymers and copolymers of ethylenesulphonic acid are useful as tanning and emulsifying agents. Their salts, in particular the ammonium salts may be used as flameproofing agents for fabrics, ropes, curtains, tapestries, etc., and the water soluble salts may be used as emulsifying agents.

The term polymers is used in the generic sense to include copolymers as well as polymers of essentially but one polymerizable substance, i. e., polymers obtained by polymerizing ethylenesulphonic acid or a derivative thereof in the absence of another polymerizable substance in the presence or absence of non-polymerizable materials, e. g., catalysts, fillers, dyes, etc. By "co-polymer" is meant the product obtained by polymerizing together two or more ethylenesulphonic acid derivatives, or a mixture of ethylenesulphonic acid or derivative thereof with one or more other polymerizable compound, as defined above.

The above description and examples are intended to be illustrative only. Any modification of or variation therefrom which conforms to the spirit of the invention is intended to be included within the scope of the claims.

What is claimed is:

1. A polymer of an ester of ethylenesulphonic acid.
2. An ester of ethylenesulphonic acid.
3. A copolymer of an ester of ethylenesulphonic acid with another polymerizable compound selected from the class consisting of styrene, vinyl acetate, methyl methacrylate, unsymmetrical dichloroethylene, vinyl chloride, vinyl bromide, methyl alpha chloroacrylate, chloroprene, 1,3-butadiene and methyl vinyl ketone.
4. A polymer of ethyl ethylenesulphonate.
5. A coplymer of ethyl ethylenesulphonate with vinyl acetate.
6. A copolymer of ethyl ethylenesulphonate with methyl methacrylate.
7. A copolymer of ethyl ethylenesulphonate with methyl alpha-chloroacrylate.
8. Ethyl ethylenesulphonate.

VAN VERNON ALDERMAN.
WILLIAM EDWARD HANFORD.

CERTIFICATE OF CORRECTION.

Patent No. 2,348,705.  May 16, 1944.

VAN VERNON ALDERMAN, ET AL.

It is hereby certified that error appears in the above numbered patent requiring correction as follows: In the grant, line 7, title of invention, for "ETHYLENESULPHONYL POLYMER" read --ETHYLENESULPHONYL POLYMERS--; page 3, first column, line 5, for "chlorides" read --chloride--; and that the said Letters Patent should be read with this correction therein that the same may conform to the record of the case in the Patent Office.

Signed and sealed this 4th day of July, A. D. 1944.

Leslie Frazer

(Seal)  Acting Commissioner of Patents.